March 19, 1940.  F. A. NOVOTNEY  2,194,403
END GATE LOADER
Filed June 19, 1939  2 Sheets-Sheet 1
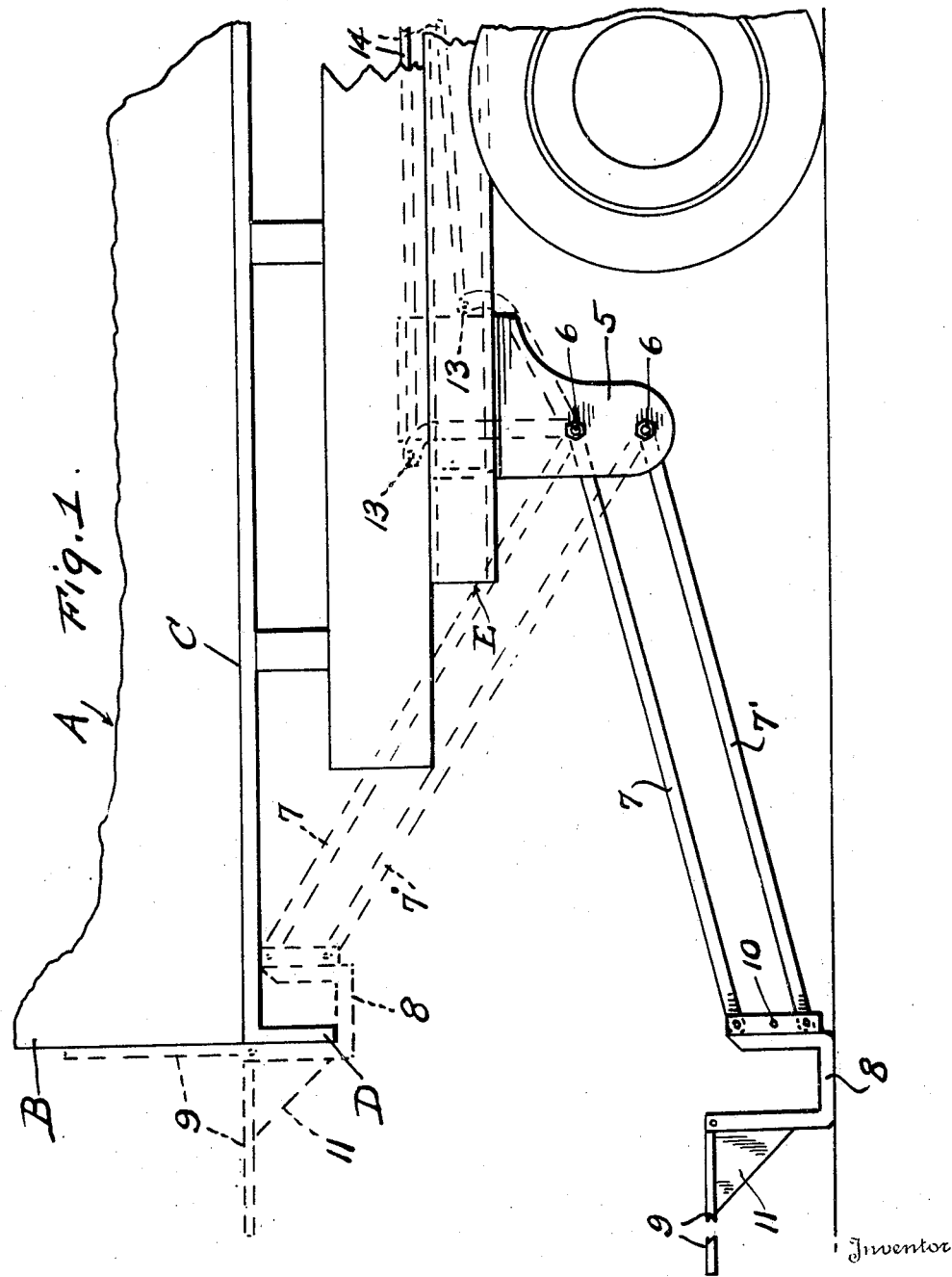
Inventor
Frank A. Novotney
By L. B. James
Attorney March 19, 1940.          F. A. NOVOTNEY          2,194,403
                         END GATE LOADER
                      Filed June 19, 1939          2 Sheets-Sheet 2
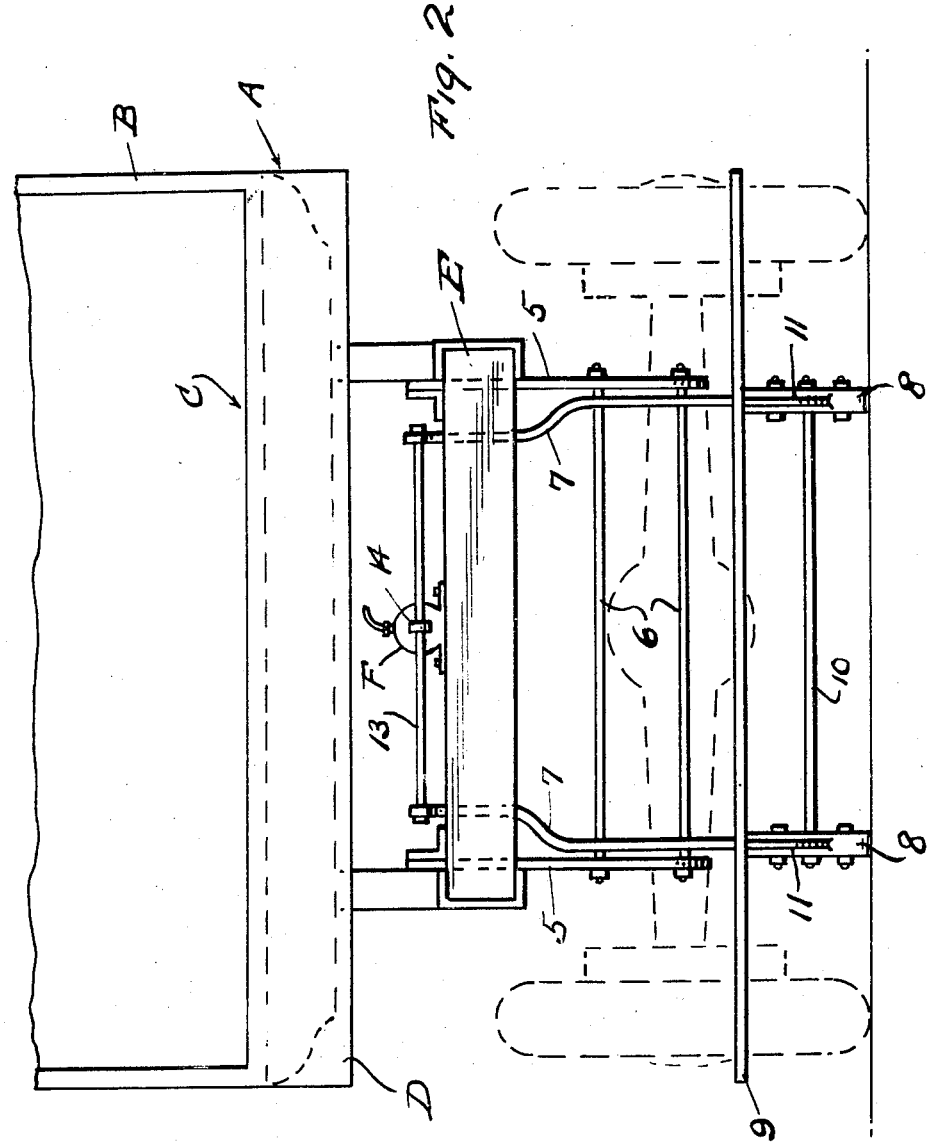
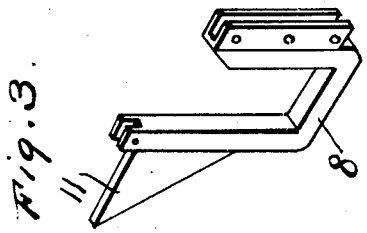
Inventor
Frank A. Novotney Patented Mar. 19, 1940

2,194,403

UNITED STATES PATENT OFFICE 2,194,403

END GATE LOADER

Frank A. Novotney, Streator, Ill.

Application June 19, 1939, Serial No. 279,969

2 Claims. (Cl. 214—77)

This invention relates to drayage vehicles and more particularly to a loading end gate therefor.

The primary object of this invention resides in the provision of means connected to the end gate of a drayage vehicle whereby it can be lowered for loading and elevated with the load thereon to the level of the floor of the vehicle body for subsequent movement into the body of the vehicle.

Another object of this invention resides in the provision of a loading platform for drayage vehicles adapted to be operated by means connected to the motor of the vehicle.

A further object of this invention resides in the particular construction of the end-gate supporting yokes and manner of coaction with the rear end cross-piece of the vehicle body.

A still further object of this invention resides in the particular means for raising and lowering the end-gate on a horizontal plane.

Among the many objects of this invention is the particular manner of mounting the end-gate on the supporting yokes therefor.

With these and other objects in view this invention resides in certain novel features of construction and arrangement of elements to be hereinafter more particularly set forth in the specification and pointed out in the appended claims and, while this disclosure depicts my present conception of the invention, the right is reserved to resort to such changes in construction and arrangement of elements as come within the scope of the claims.

In the accompanying drawings forming a part of this application:

Figure 1 is a side view of a drayage vehicle showing the elements of this invention operably connected thereto, the same being disclosed by full lines in lowered position and dotted lines in elevated position.

Figure 2 is a rear view thereof.

Figure 3 is a detail perspective view of one of the platform supporting yokes.

In the present illustration of this invention the letter A designates a conventional drayage vehicle preferably a motor truck which, among other elements, consists of a body B having a floor C provided with a cross-piece D at its rear end adapted to strengthen the rear edge of the vehicle body and act as an abutment for yokes to be hereinafter setforth, said body being mounted in the usual manner on the vehicle chassis indicated at E.

Suitably secured to the side members of the vehicle chassis are spaced brackets 5 connected adjacent their lower extremities by vertically aligned cross-rods 6 which form pivot supports for upper and lower parallel arms 7 and 7' extending rearwardly of the vehicle with their free ends pivotally connected to yokes 8 adapted to hingedly secure the inner end of a substantially rectangular plate 9 thereto, said plate being substituted for the conventional end-gate of the vehicle. The aforesaid yokes 8 when in elevated position straddle and abut the cross-piece D so as to dispose the plate 9 on a level with the floor of the vehicle body to permit readily shifting of a load on and off the same.

In order to retain the yokes in rigid spaced relation to one another they are connected by a suitable cross-rod 10.

Carried by the yokes and extending rearwardly therefrom are braces 11 which support the plate 9 in a horizontal position when in loading position and permit it to swing against the rear of the vehicle when used as an end-gate.

The inner ends of the upper arms 7 are angularly disposed to the rearwardly extending portions thereof and are connected by a cross-rod 13 which in turn is connected to a suitable motor operated mechanism, indicated by the letter F, through the instrumentality of a link 14 or other suitable means.

With this invention connected adjacent the load receiving opening of a drayage vehicle it is apparent means are provided whereby the articles to be loaded on the vehicle can be elevated to the floor level thereof and readily shifted within the vehicle body and, through the simplicity of the mechanism involved, the same is positive in operation and cheap to manufacture.

Having thus described my invention what I claim and desire to protect by Letters Patent is:

1. The combination with a drayage vehicle including a chassis and having a cross-piece at its rear end, of brackets secured to opposite sides of the vehicle chassis, pairs of rearwardly extending arms pivotally supported by the brackets, yokes pivotally supported on the rear ends of the arms in arcuate alignment with the cross-piece of the vehicle, and end-gate pivotally connected to the rear ends of the yokes, a brace on each yoke supporting the end-gate in a horizontal position, a cross-rod connecting the yokes in spaced relation, a cross-rod connecting the inner ends of certain of the arms and means connected to the last mentioned cross-rod for rocking the arms on their pivotal connections to the brackets.

2. The combination with a drayage vehicle including a chassis, of brackets secured to the opposite sides of the chassis and suspended therefrom, pairs of rearwardly extending arms pivoted to each bracket, substantially U-shaped yokes pivotally connected to the rear ends of the arms, a cross-rod connecting the yokes, an end-gate hingedly connected to the rearmost arms of the yokes, a brace formed on the rearmost arms of the yokes and supporting the end-gate in horizontal position, a cross-rod connecting the forward ends of certain of the arms, a link connected to the last metioned cross-rod and extending forwardly of the vehicle and means connected to the link for transmitting motion thereto in a forward and rearward direction.

FRANK A. NOVOTNEY.